(12) United States Patent
Lai

(10) Patent No.: US 7,232,321 B1
(45) Date of Patent: Jun. 19, 2007

(54) CARD CONNECTOR CAPABLE OF PREVENTING ELECTRONIC CARD FROM ACCIDENTAL DISENGAGEMENT THEREFROM

(75) Inventor: Yaw-Huey Lai, Taipei County (TW)

(73) Assignee: Tai-Sol Electronics Co., Ltd, Taipei (TW)

( * ) Notice: Subject to any disclaimer, the term of this patent is extended or adjusted under 35 U.S.C. 154(b) by 0 days.

(21) Appl. No.: 11/637,735

(22) Filed: Dec. 13, 2006

(30) Foreign Application Priority Data

Sep. 29, 2006 (TW) .............................. 95217477 U

(51) Int. Cl.
*H01R 13/62* (2006.01)
(52) U.S. Cl. ...................................................... 439/159
(58) Field of Classification Search ......... 439/157–160
See application file for complete search history.

(56) References Cited

U.S. PATENT DOCUMENTS 6,488,528 B2 * 12/2002 Nishioka .................... 439/188
6,817,874 B2 * 11/2004 Okabe ........................ 439/157
6,835,077 B2 * 12/2004 Ikeda et al. ................. 439/159
6,929,491 B1 * 8/2005 Chi-Te ........................ 439/159

* cited by examiner

*Primary Examiner*—Briggitte R. Hammond
(74) *Attorney, Agent, or Firm*—Bacon & Thomas, PLLC

(57) ABSTRACT

A card connector capable of preventing a card from accidental disengagement therefrom includes a housing having a base plate, a stationary terminal area located at a first side of the base plate, and a concave portion located at a second side of the base plate; a slide member slidably mounted in the concave portion; and an anti-run member having a main body, a fastening piece formed at a rear end of the main body, and a buckle portion formed at a front end of the main body. An elongated slide way is formed in the concave portion and located close to the stationary terminal area. An inclined guide portion is formed at a front end of the slide way. A recess is formed at a front end of the guide portion. The main body of the anti-run member further has a support piece extending toward the first side therefrom.

10 Claims, 7 Drawing Sheets

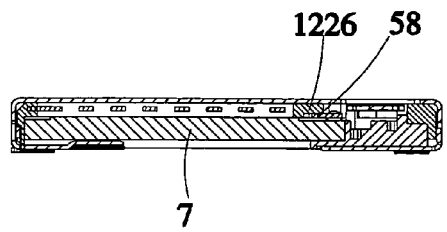
FIG.10
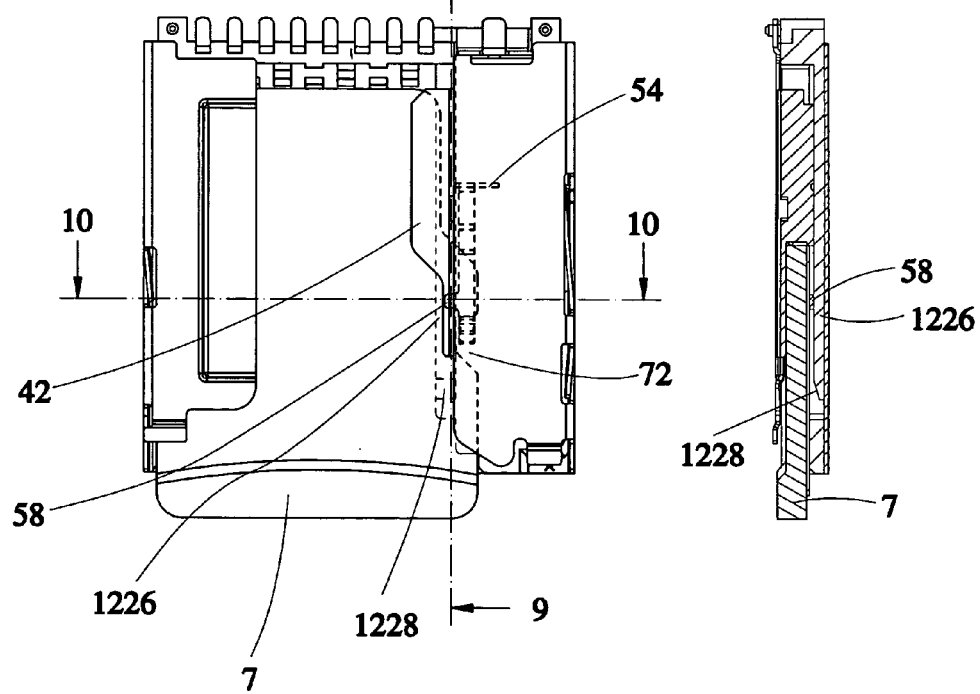
FIG.8 FIG.9

CARD CONNECTOR CAPABLE OF PREVENTING ELECTRONIC CARD FROM ACCIDENTAL DISENGAGEMENT THEREFROM

BACKGROUND OF THE INVENTION

1. Field of the Invention

The present invention relates generally to electronic card connectors, and more particularly, to a card connector capable of preventing a card from accidental disengagement therefrom.

2. Description of the Related Art

A conventional card connector, as shown in FIG. 12, includes a slide member 4' and an anti-run buckle 5' fixed to the slide member 4' and having a buckle portion 56'. While a card 7' is inserted into the card connector, the card 7' pushes the slide member 4' to move backward and the buckle portion 56' is correspondingly buckled into a concavity located at a side of the card 7'. When the card connector is violently shocked or wobbled, the buckle portion 56' of the anti-run buckle 5' likely disengages from the concavity of the card 7' to further disengage the card 7' from the card connector.

SUMMARY OF THE INVENTION

The primary objective of the present invention is to provide a card connector which can effectively prevent a card from accidental disengagement therefrom.

The foregoing objective of the present invention is attained by the card connector composed of a housing, a slide member, and an anti-run member. The housing includes a base plate, a stationary terminal area located at a first side of the base plate for mounting conductive terminals, and a slide channel formed on the base plate. The slide member is slidably mounted in the slide channel for forward and backward slidable movement. The anti-run member includes a main body, a fastening piece bending and extending from a rear end of the main body, and a buckle portion bending and extending upward from a front end of the main body. The fastening piece is fixed onto the slide member. An elongated slide way is formed in the concave portion and located close to the stationary terminal area. An inclined guide portion is formed at a front end of the slide way. A recess is formed at a front end of the guide portion. The main body of the anti-run member further includes a support piece extending toward the first side of the base plate. In light of this, the card can be stably engaged to avoid disengagement from the card connector while inserted.

BRIEF DESCRIPTION OF THE DRAWINGS

FIG. 8 is similar to FIG. 6, illustrating the card is fully inserted into the card connector.

FIG. 9 is a cross-sectional view taken from a line 9-9 indicated in FIG. 8.

FIG. 10 is a cross-sectional view taken from a line 10-10 indicated in FIG. 8.

DETAILED DESCRIPTION OF PREFERRED EMBODIMENTS

Figure 1:
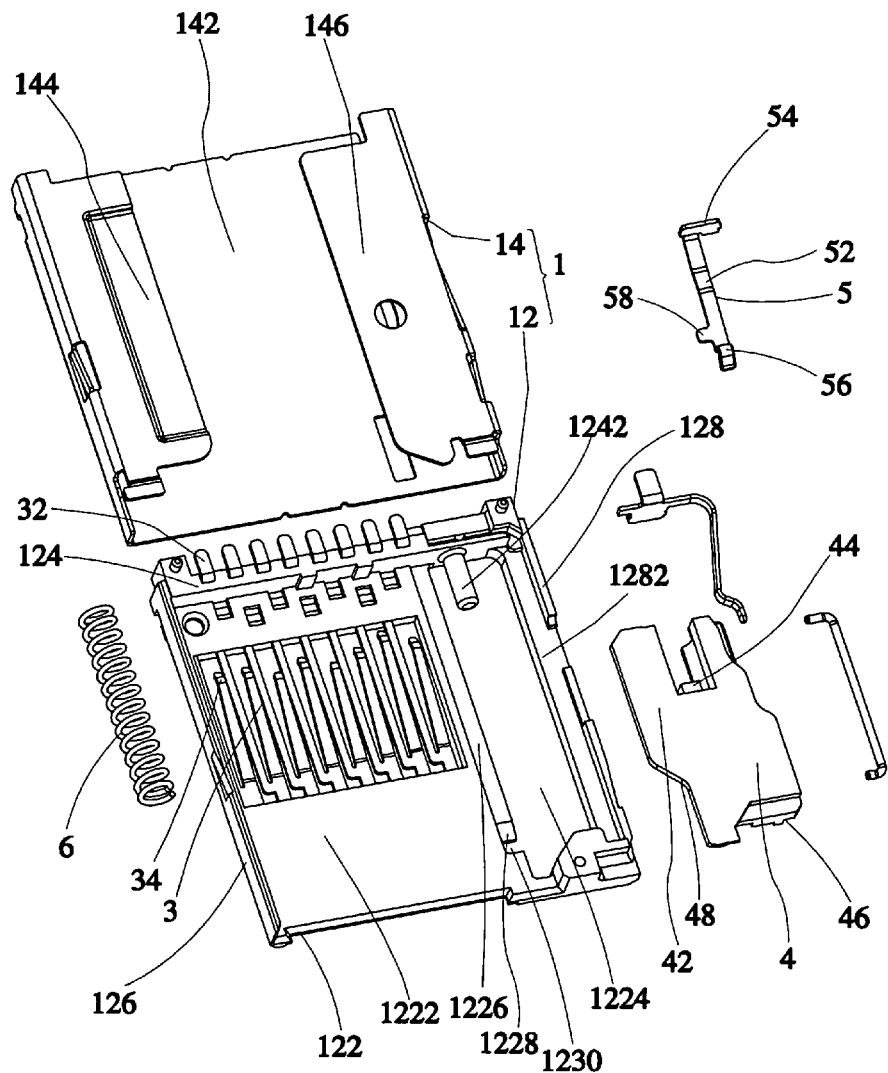
FIG. 1 is an exploded view of a preferred embodiment of the present invention.
Figure 2:
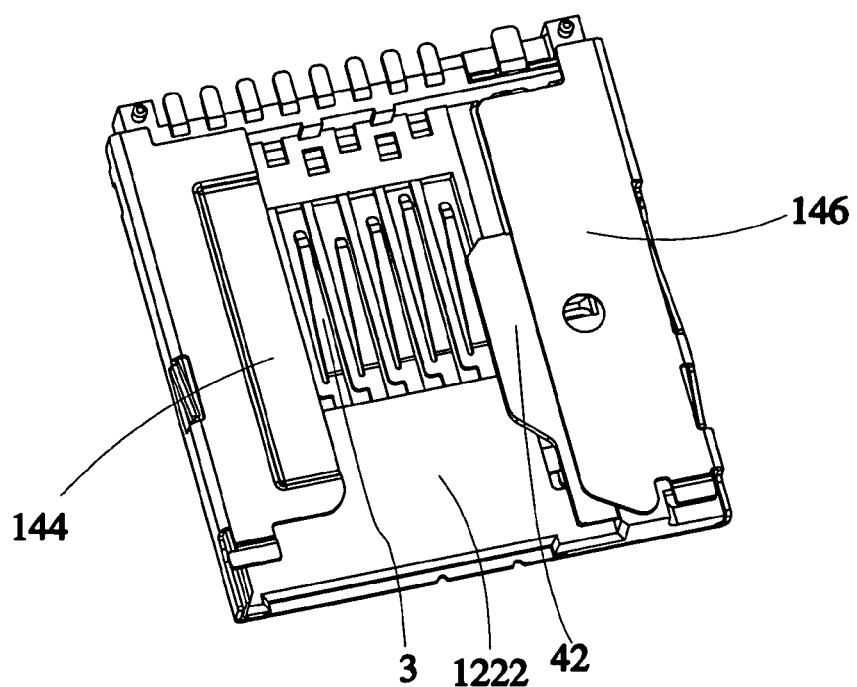
FIG. 2 is a perspective view of the preferred embodiment of the present invention.
Figure 3:
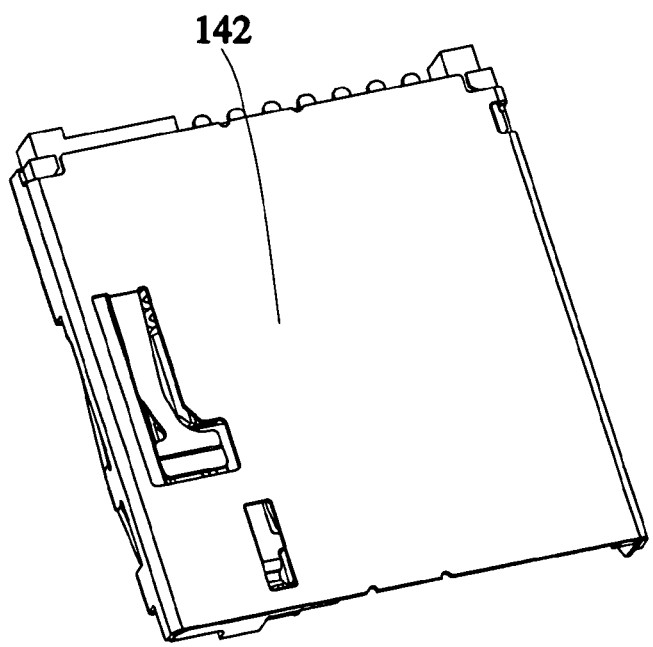
FIG. 3 is a perspective bottom view of the preferred embodiment of the present invention.
Figure 4:
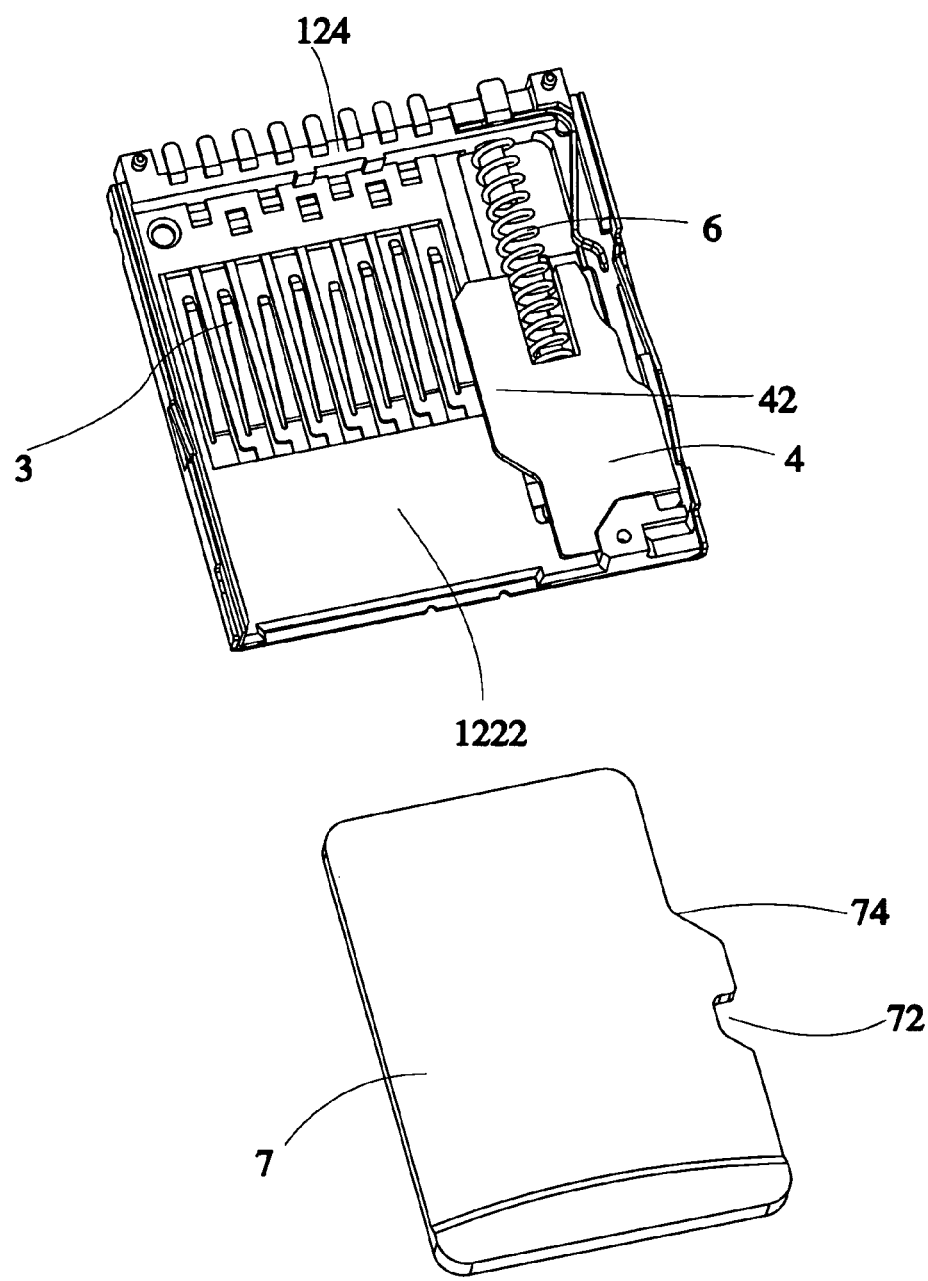
FIG. 4 is a partial perspective view of the preferred embodiment of the present invention before a card is inserted therein.
Figure 5:
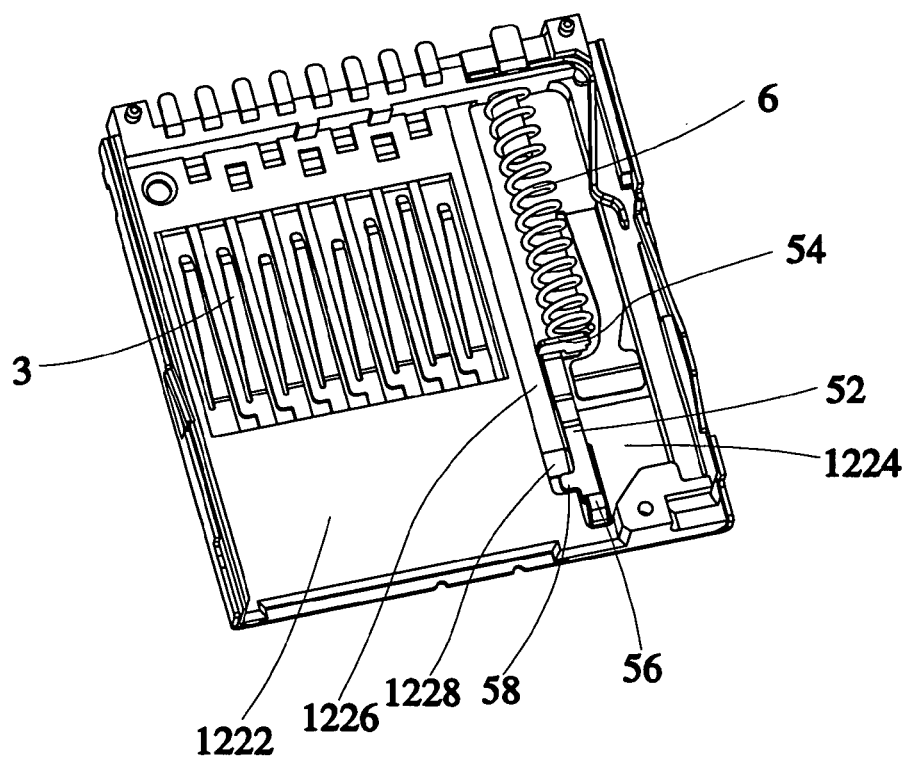
FIG. 5 is another partial perspective view of the preferred embodiment of the present invention which cover member and slide member are removed therefrom.
Figures 6, 7:
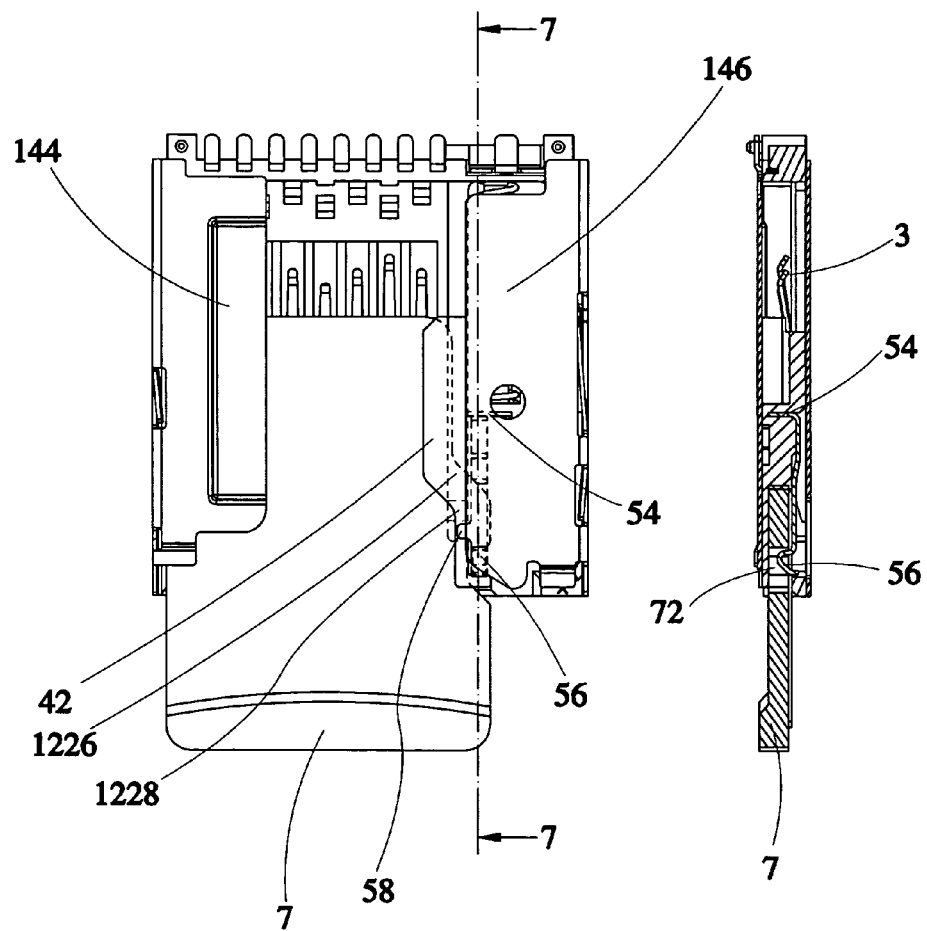
FIG. 6 is a top view of the preferred embodiment of the present invention, illustrating the card is initially inserted therein.
FIG. 7 is a cross-sectional view taken from a line 7-7 indicated in FIG. 6.
Figure 11:
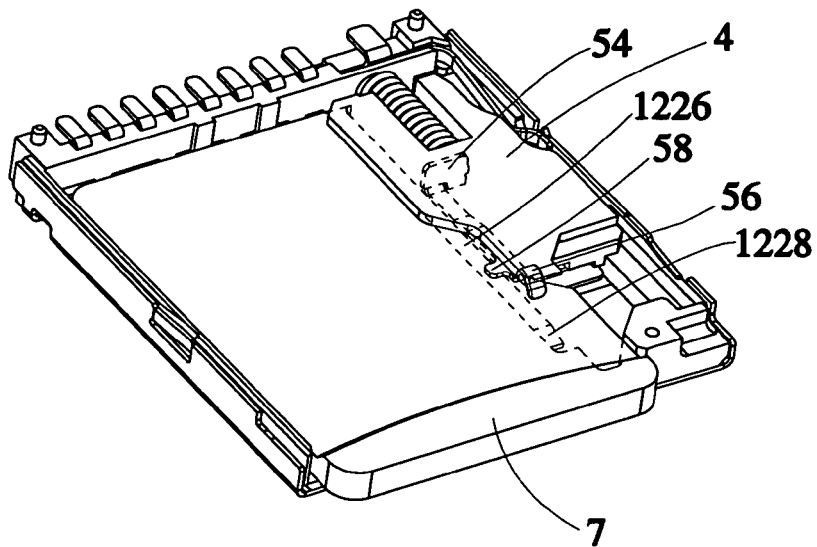
FIG. 11 is another partial perspective view of the preferred embodiment of the present invention, illustrating the card is fully inserted therein.
Figure 12:
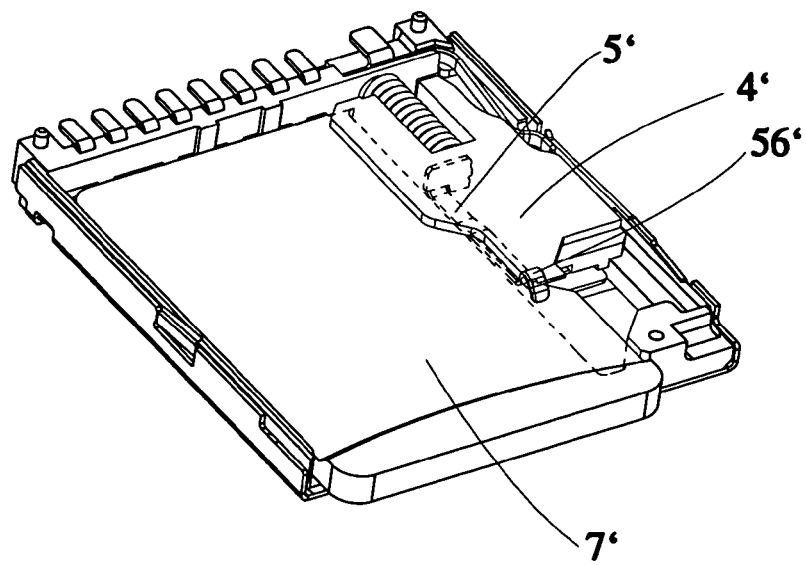
FIG. 12 is a perspective bottom view of the conventional card connector.

Referring to FIGS. 1-11, a card connector capable of preventing an electronic card from accidental disengagement therefrom, constructed according to a preferred embodiment of the present invention, is composed of a housing 1, a group of conductive terminals 3, a slide member 4, an anti-run member 5, and a spring 6.

The housing 1 includes a base 12 and a cover member 14.

The base 12 includes a base plate 122, a rear plate 124 extending vertically upward from a rear end edge of the base plate 122, a first side plate 126 extending vertically upward from an end edge of a first side of the base plate 122, and a second side plate 128 extending vertically upward from an end edge of a second side of the base plate 122. The base plate 122 has a stationary terminal area 1222 formed at the first side thereof for mounting the conductive terminals, a concave portion 1224 formed at the second side thereof, an elongated slide way 1226 formed in the concave portion 1224 and located close to the stationary terminal area 1222 and extending longitudinally and having a constant width from a front end thereof to a rear end thereof, an inclined guide portion 1228 formed at the front end of the slide way 1226, and a recess 1230 formed at a front end of the guide portion. The rear plate 124 has a first lug 1242 protruding toward the concave portion 1224. A slide rail 1282 is formed in the concave portion 1224 and located close to the second side plate 128.

The cover member 14 includes a bottom plate 142, a first top cover 144 extending vertically upward and bending vertically and extending toward the second side from the end edge of the first side of the base plate 122, and a second top cover 146 extending vertically upward and bending vertically and extending toward the first side from the end edge of the second side of the base plate 122. The first top and second top covers 144 and 146 are located over the base plate 122.

The conductive terminals 3 each include a root portion 32 and a contact portion 34. Each of the root portions 32 is inserted in the rear plate 124. Each of the contact portions 34 is mounted to the stationary terminal area 1222.

The slide member 4 is slidably mounted to the concave portion 1224 for longitudinally slidable movement. The slide member 4 includes a top guard 42 extending toward the first side from a top side thereof, a second lug 44 formed at a rear end thereof and corresponding to the first lug 1242 of the rear plate 124, a slide channel 46 formed at a bottom side thereof and corresponding to the slide rail 1282, and a push portion 48 formed at a side thereof.

The anti-run member 5 includes a main body 52, a fastening piece 54 bending and extending upward from a rear end of the main body 52, an arched buckle portion 56 bending and extending upward from a front end of the main body 52, and a support piece 58 extending horizontally toward the first side therefrom and located close to the buckle portion 56. The fastening piece 54 is mounted to a bottom rear end of the slide member 4. The main body 52 and the buckle portion 56 are mounted under the top guard 42 of the slide member 4.

The spring 6 includes two ends inserted into the first lug 1242 of the rear plate 124 and into the second lug 44 of the slide member 4 respectively.

When the card connector of the present invention is being assembled, first mount the fastening piece 54 of the anti-run member 5 to the bottom rear end of the slide member 4, and then mount the slide member 4 to a front end of the concave portion 1224, enabling the slide channel 46 to engage the slide way 1228 and the support piece 58 to be located at the front end of the guide portion 1228 of the slide way 1226; mount the spring 6 to between the rear plate 124 and the slide member 4 and into the cover member 14. The second top cover 146 is located above the slide member 4.

While an electronic card 7 having a side portion 74 and a concavity 72 is initially inserted into the card connector, the side portion 74 contacts the push portion 48 of the slide member 4 and the buckle portion 56 of the anti-run member 5 is located below the concavity 72 of the card 7. While the card 7 continues to enter further, it pushes the slide member 4 to move toward the rear plate 124 and the anti-run member 5 is moved along with the rear plate 124. In the meantime, the support piece 58 is moved from the recess 1230 along the guide portion 1228 to be located over the slide way 1226 and the buckle portion 56 of the anti-run member 5 engages the concavity 72 of the card 7, thus enabling the card 7 to be locked up by the anti-run member 5. When the card connector is violently shocked and wobbled, because the slide way 1226 generates an upward supporting force for the support piece 58, the buckle portion 56 fails to disengage from the concavity 72 and keeps lock-up in the concavity 72, thus securely preventing the card 7 from movement and disengagement from the card connector.

In light of the above, the present invention employs the slide way 1226, the guide portion 1228, and the recess 1230 in cooperation with the support piece 58 to enable the buckle portion 56, while the card 7 is initially inserted, to engage the concavity 72 and to disable the buckle portion 56, while the card 7 is pulled out, from disengagement from the concavity 72, thus effectively preventing the card 7 inserted in the card connector from disengagement.

It is to be noted that the above-mentioned first and second sides are the left and right sides of the base plate in this embodiment. The first side can alternatively be the right side and the second side can alternatively be the left side, which are the equivalent interchange of the present invention and fall in the scope of the appended claim.

Although the present invention has been described with respect to a specific preferred embodiment thereof, it is no way limited to the details of the illustrated structures but changes and modifications may be made within the scope of the appended claims.

What is claimed is:

1. A card connector capable of preventing a card from disengagement therefrom, comprising:
a housing having a base plate, a stationary terminal area formed at a first side of said base plate for mounting conductive terminals, a concave portion formed at a second side of said base plate, an elongated slide way formed in said concave portion and located close to said stationary terminal area, an inclined guide portion formed at a front end of said slide way, and a recess formed at a front end of said guide portion;
a slide member slidably mounted in said concave portion for forward and backward slidable movement; and
an anti-run member having a main body, a fastening piece bending upward and extending from a rear end of said main body, a buckle portion bending upward and extending from a front end of said main body, and a support piece extending toward the first side of said base plate from said main body, said fastening piece being fixed onto said slide member.

2. The card connector as defined in claim 1, wherein the first side is the left side of said base plate and the second side is the right side of said base plate.

3. The card connector as defined in claim 1, wherein the first side is the right side of said base plate and the second side is the left side of said base plate.

4. The card connector as defined in claim 1 or 2 or 3, wherein said slide way extends longitudinally and upward.

5. The card connector as defined in claim 4 wherein said slide way has a constant width from a front end thereof to a rear end thereof.

6. The card connector as defined in claim 1 or 2 or 3, wherein said buckle portion of said anti-run member is arched.

7. The card connector as defined in claim 1 or 2 or 3, wherein said support piece is mounted to said main body and located close to said buckle portion of said anti-run member.

8. The card connector as defined in claim 1 or 2 or 3, wherein said slide member further comprises a top guard extending toward the first side of said base plate from a top side thereof.

9. The card connector as defined in claim 1 or 2 or 3, wherein said housing further comprises a base and a cover member, said base having a bottom plate, a first top cover extending vertically upward and bending vertically and extending toward the second side from an end edge of the first side of said base plate, and a second top cover extending vertically upward and bending vertically and extending toward the first side from an end edge of the second side of said base plate, said first and second top covers being located over said base plate respectively.

10. The card connector as defined in claim 9, wherein said rear plate further comprises a first lug protruding toward said concave portion therefrom; said slide member further comprises a second lug formed at a rear end thereof and corresponding to said first lug; said card connector further comprises a spring having two ends mounted to said first and second lugs respectively.

* * * * *